G. D. GREENLEAF & D. C. LARKINS.
APPARATUS FOR TREATING MILK.
No. 76,749. Patented Apr. 14, 1868.
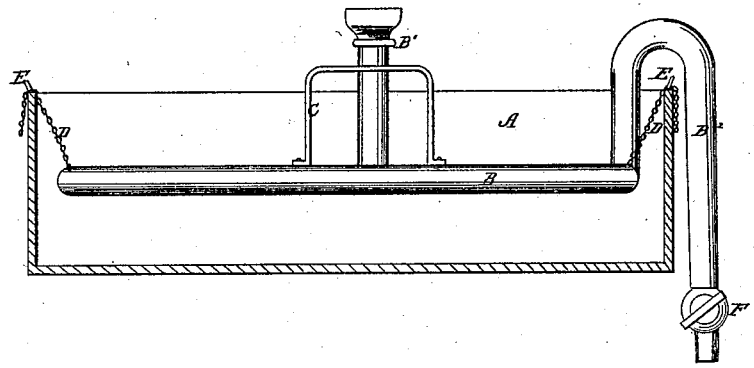
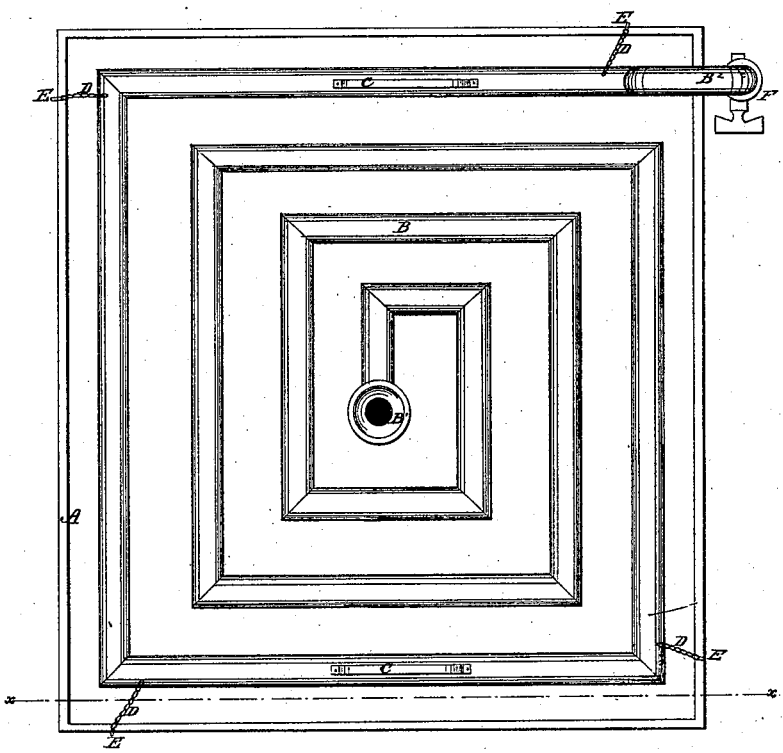

United States Patent Office.

GEORGE D. GREENLEAF AND DARIUS C. LARKINS, OF DEPAUVILLE, NEW YORK.

Letters Patent No. 76,749, dated April 14, 1868.

IMPROVEMENT IN APPARATUS FOR TREATING MILK.

The Schedule referred to in these Letters Patent and making part of the same.

TO ALL WHOM IT MAY CONCERN:

Be it known that we, GEORGE D. GREENLEAF and DARIUS C. LARKINS, of Depauville, in the county of Jefferson, and State of New York, have invented a new and useful Improvement in Apparatus for Treating Milk; and we do hereby declare that the following is a full, clear, and exact description thereof, which will enable those skilled in the art to make and use the same, reference being had to the accompanying drawing, forming part of this specification, in which—

Figure 1 is a sectional elevation of an apparatus made according to our invention, the line of section being seen at $x$, fig. 2.

Figure 2 is a plan view.

Similar letters of reference indicate like parts.

The object of this invention is to provide a convenient and economical apparatus by which milk can be heated or cooled, according to the use to be made of it, and it consists in placing a coiled pipe within a pan or other receptacle of the milk, through which pipe the heating or cooling-medium is passed, the pipe being laid down next to the bottom if the object is to heat the milk, but being suspended above the bottom if the milk is to be cooled.

Cheese and butter-manufacturers find much difficulty in cooling milk for dairy purposes soon enough and sufficiently to prevent it from becoming sour. Our apparatus for treating milk will obviate this difficulty, and cheapen the making of cheese, and add largely to the product in making butter.

According to our invention, we use but one vat, A, instead of two, as in the mode now commonly practised, into which the milk to be treated is poured.

B is a coil of pipe, arranged in the general form of the vat or pan, having its commencement at its centre, where its end, $B^1$, is turned up, and is provided with a funnel-shaped mouth. Its other end is turned over the edge of the vat, and carried down below the level of the vat, so as to form a siphon, $B^2$, whose outlet is governed by a stop-cock, F. The coils at opposite sides are provided with handles, C C, by which to lift the pipe out of the vat when it is necessary so to do.

If the milk in the vat is to be cooled, we suspend the coil at such a height as barely to submerge it, by means of the chains D and the hooks E, and then discharge a current of cold water, iced water if it can be had, into the mouth of the pipe. The water passes through the pipe, and out through the siphon, its discharge therefrom being governed by the faucet F. That portion of the milk which surrounds the elevated pipe will become cooled first, and, since it will immediately descend, it induces a current in the vat, that portion of the milk whose temperature has not been reduced flowing upwards, to take the place of the descending portion. The size of the pipe is a question of judgment, but a pipe one inch or one inch and a half in diameter will probably be large enough.

When used for heating milk for cheese, we lower the pipe until its coils rest on the bottom of the vat, and pass steam or hot water through it in a similar way as explained of cold water. The curd of cheese is now worked to the bottom of the vat, to prevent it from settling in a hard mass, in the common process of making cheese.

To allow of such working, and to prevent the curd from becoming hard in spots under the water-pipe, we make the pipe semicircular, and lay the flat sides of the coils on the bottom of the vat, thus giving the operator an opportunity to stir every part of the curd.

It will be observed that, by means of our invention, the same apparatus can be used both for cooling and heating milk, the pipe being suspended in the former case, and lowered, and allowed to rest on the bottom, in the other.

We claim as new, and desire to secure by Letters Patent—

1. The cooling-pipes B, adjusted in the pan or vat A, by means of the chains D and pins E, as herein described, for the purpose specified.

2. The combination and arrangement of the adjustable pipes B, having central turned-up end $B^1$ and siphon $B^2$, the handles C, and vat A, as herein described, for the purpose specified.

GEO. D. GREENLEAF,
D. C. LARKINS.

Witnesses to G. D. GREENLEAF's signature:
   E. S. BEARSS,
   MARIA T. BEARSS.

Witnesses to D. C. LARKINS's signature:
   L. E. PHILLIPS,
   L. PHILLIPS.